(12) United States Patent
Van Den Brink et al.

(10) Patent No.: US 7,011,801 B2
(45) Date of Patent: Mar. 14, 2006

(54) METHOD FOR THE SIMULTANEOUS REMOVAL OF NITROGEN OXIDES AND LAUGHING GAS FROM A GAS STREAM CONTAINING NITROGEN OXIDES AND LAUGHING GAS

(75) Inventors: Rudolf Willem Van Den Brink, Amsterdam (NL); Jan Remmert Pels, Alkmaar (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 32 days.

(21) Appl. No.: 10/470,756

(22) PCT Filed: Jan. 31, 2002

(86) PCT No.: PCT/NL02/00075

§ 371 (c)(1),
(2), (4) Date: Jan. 7, 2004

(87) PCT Pub. No.: WO02/060563

PCT Pub. Date: Aug. 8, 2002

(65) Prior Publication Data

US 2004/0109804 A1    Jun. 10, 2004

(30) Foreign Application Priority Data

Jan. 31, 2001    (NL) .................................... 1017245

(51) Int. Cl.
*B01J 8/00* (2006.01)
*C01B 21/00* (2006.01)
(52) U.S. Cl. ................ 423/239.2; 423/239.1; 423/235
(58) Field of Classification Search .............. 423/235, 423/236, 239.1, 239.2; 502/64–79
See application file for complete search history.

(56) References Cited

U.S. PATENT DOCUMENTS

| 4,003,976 A | | 1/1977 | Komatsu et al. |
| 5,849,254 A | * | 12/1998 | Suzuki et al. ............ 423/213.5 |
| 6,217,831 B1 | * | 4/2001 | Suzuki et al. ............... 422/177 |
| 6,872,372 B1 | * | 3/2005 | Verhaak .................. 423/239.2 |

FOREIGN PATENT DOCUMENTS

| EP | 0496526 A1 * | 1/1992 |
| EP | 0541008 B1 * | 1/1996 |
| EP | 0 935 055 | 8/1999 |
| GB | 2 162 830 | 2/1986 |
| WO | WO 99 49954 | 10/1999 |
| WO | WO 01/21288 A1 * | 3/2001 |
| WO | WO 01 74475 | 10/2001 |

OTHER PUBLICATIONS

Kapteijn F et al:, "Kinetic Analysis of the Decomposition of Nitrous Oxide Over ZSM-5 Catalysts" Journal of Catalysis, Academic Press, Duluth MN, US, vol.. 167, 1997, pp. 256-265, XP000979359 ISSN: 0021-9517 p. 257-p. 258.

* cited by examiner

Primary Examiner—Colleen P. Cooke
(74) Attorney, Agent, or Firm—Young & Thompson (57) ABSTRACT

A method for the simultaneous removal of nitrogen oxides and laughing gas from a stream containing nitrogen oxides and laughing gas, wherein a first catalyst that contains cobalt and, as support, an inorganic metal oxide, and a second catalyst that contains iron and, as support, an inorganic metal oxide, are used. In particular the method is carried out in such a way that (a) the gas stream containing nitrogen oxides and laughing gas is reacted with a reducing gas, the reducing gas comprising a saturated hydrocarbon, in the presence of the first catalyst and (b) the gaseous product from step (a) is reacted with a reducing gas, the reducing gas comprising a saturated hydrocarbon, in presence of a second catalyst. The catalyst system can be used for the treatment of off-gases from a nitric acid plant.

18 Claims, 5 Drawing Sheets

METHOD FOR THE SIMULTANEOUS REMOVAL OF NITROGEN OXIDES AND LAUGHING GAS FROM A GAS STREAM CONTAINING NITROGEN OXIDES AND LAUGHING GAS

CROSS REFERENCE TO RELATED APPLICATION

This is the 35 USC 371 national stage of international application PCT/NL02/00075 filed on Jan. 31, 2002, which designated the United States of America.

FIELD OF THE INVENTION

The invention relates to a method for the simultaneous removal of nitrogen oxides ($NO_x$) and laughing gas ($N_2O$) from a gas stream containing nitrogen oxides and laughing gas. In this description nitrogen oxides ($NO_x$) are understood to be NO, $NO_2$ and a mixture of NO and $NO_2$.

BACKGROUND OF THE INVENTION

Li and Armor [Appl. Catal. B3, 55–60, 1993] describe the Co-ZSM-5-catalysed simultaneous decomposition of NO and $N_2O$ in the presence of methane or propane and oxygen:

It has been found that although NO is still converted with a high degree of conversion at low temperature, the degree of conversion of $N_2O$ decreases sharply at lower temperature. A temperature in the range of 450° C. to 500° C. is found to be necessary for a high degree of conversion of $N_2O$ (see Li and Armor: Table 1). Furthermore, it is found that the degree of conversion of NO is higher when pure oxygen is used instead of $N_2O$ as oxygen source (see Li and Armor: Table 2). On the other hand, the reduction of $N_2O$ proceeds less favourably when both methane and oxygen are present (see Li and Armor: Table 3). The highest degrees of conversion are achieved at 500° C.; at this temperature 97% of the $N_2O$ and only 30% of the NO are converted. This method thus has the disadvantage that the temperature range in which acceptable conversion of both NO and $N_2O$ takes place is relatively narrow. In addition, this temperature is relatively high (450–500° C.). Moreover, the supply of oxygen has an advantageous effect (higher degree of conversion of NO), but also an adverse effect (lower degree of conversion of $N_2O$).

Kögel et al. [Catal. Lett. 51, 23–25, 1998] describe the Fe-MFI-catalysed simultaneous decomposition of NO and $N_2O$ in the presence of propane and oxygen. It has been found that although NO is still converted with a high degree of conversion at low temperature, the degree of conversion of $N_2O$ decreases sharply at lower temperature (see Kögel et al.: FIG. 2): the maximum degree of conversion of NO (40%) is reached at 300° C. and at this temperature the degree of conversion of $N_2O$ is only approximately 5%. Moreover, the undesired CO is formed as a by-product. However, this disadvantage can be eliminated if a Pt-promoted Fe-MFI is used (oxidation of CO to $CO_2$). However, this has an adverse effect on the degrees of conversion of NO and $N_2O$ (see Kögel et al.: FIG. 3). A possible combination of this type of catalyst with the catalyst described by Li and Armor is not obvious because, inter alia, the optimum temperatures are very different (300° C. and 450–500° C., respectively).

Perez-Ramirez et al. [Appl. Catal. B, 25, 191–203, 2000] describe a dual-bed catalytic system intended for the removal of nitrogen oxides (NO and $NO_2$) from a gas stream. In the first step $NO_x$ conversion takes place with the aid of a Pt/AC catalyst in the presence of propene as reducing agent. A major disadvantage of such a catalyst is that during the conversion of NO the formation of laughing gas takes place as the main reaction. Perez-Ramirez et al. therefore also studied whether this laughing gas formed can be effectively converted into nitrogen and oxygen in a second step in the presence of propene using Fe-ZSM-5. However, the use of these two catalysts has the disadvantage that two reactors have to be used because the optimum temperature ranges for the two catalysts are far apart (Pt/AC: optimum temperature is approximately 200° C.; Fe-ZSM-5: >430° C.; see also Perez-Ramirez et al.: FIG. 10). It is true that the required temperature for the Fe-ZSM-5 catalyst can be lowered to some extent by supplying additional propene to the second reactor (the product stream from the first reactor no longer contains any propene: see page 197, left-hand column, second paragraph; when propene is supplied to the reactor containing Fe-ZSM-5 a higher degree of conversion of $N_2O$ is found; see page 199, right-hand column, second paragraph), but not to a sufficiently low value.

The reduction of $N_2O$ with the aid of a saturated hydrocarbon and an Fe-zeolite catalyst is described in WO 99/49954. The preferred temperature at which this catalyst converts $N_2O$ is below 350° C. It is neither described nor suggested that this catalyst can be used together with another catalyst for the simultaneous removal of nitrogen oxides (NO and $NO_2$) and $N_2O$.

The conversion of $NO_x$ with the use of, inter alia, a Co-zeolite catalyst is described in U.S. Pat. No. 5,149,512. Here $NO_x$ is understood to be a mixture of at least two nitrogen oxides, including laughing gas (see, for example, column 3, lines 55–59 and column 4, lines 44–48). However, the fact that in this patent $NO_x$ is not used to refer to $N_2O$ is confirmed by the later publication by Li and Armor in Appl. Catal. B 3, 1993, on page 56. The experiments show only conversions of NO and not conversions of $N_2O$. U.S. Pat. No. 5,149,512 thus does not explicitly describe whether such a catalyst is able to reduce laughing gas. The best degrees of conversion are obtained at 450° C. (see U.S. Pat. No. 5,149,512: Table 2). A combination of this cobalt catalyst for the conversion of NO with, for example, the abovementioned iron catalyst for the conversion of $N_2O$ would, on the basis of the data described, give a catalyst combination with completely different operating temperatures for the different conversions (<350° C. and 450° C., respectively) and would probably give degrees of conversion for NO that are too low. Incidentally, on the basis of this patent (U.S. Pat. No. 5,149,512) it would be best to choose a rhodium catalyst for the conversion of NO (see U.S. Pat. No. 5,149,512: Tables 1, 2, 5, 8 and 9, from which it can be seen that in the presence of $CH_4$ and $O_2$ the rhodium catalyst yields a degree of conversion of 55%, compared with 26, 34, 27 and 34%, respectively).

A combination of an iridium catalyst and a platinum catalyst is described in U.S. Pat. No. 5,997,830.

In U.S. Pat. No. 5,524,432 a catalytic reduction of nitrogen oxide (this term includes laughing gas; see U.S. Pat. No. 5,524,432: column 5, lines 12–15) is described where a reducing agent that has to contain methane is used (see U.S. Pat. No. 5,524,432: Claim 1 and column 4, lines 47–56). The advantage of this method is said to be that ammonia is not required (see Example 11, lines 19–21). The catalytic reduction is followed by a catalytic oxidation of residual methane into carbon dioxide and water. The catalyst that is used for the catalytic reduction comprises a crystalline zeolite with an Si/Al ratio of 2.5 or more and the zeolite contains cobalt, nickel, iron, chromium and/or manganese cations (see column 4, lines 37–46). Co-ZSM-5 is explicitly described in Example 5. However, U.S. Pat. No. 5,524,432 does not teach the person skilled in the art that this catalyst is suitable for the reduction of laughing gas.

SUMMARY OR THE INVENTION

The aim of the present invention is to eliminate the disadvantages described above. The invention therefore relates to a method for the simultaneous removal of nitrogen oxides and laughing gas from a gas stream containing nitrogen oxides and laughing gas, wherein a first catalyst that contains cobalt and, as support, an inorganic metal oxide, and a second catalyst that contains iron and, as support, an inorganic metal oxides are used.

It has been found that use of a specific sequence (1. cobalt-containing catalyst, 2. iron-containing catalyst) of the catalysts gives better results than, for example, a mixture of the two catalysts or a different sequence. The invention therefore also relates in particular to a method for the simultaneous removal of nitrogen oxides and laughing gas from a gas stream containing nitrogen oxides and laughing gas, wherein:

(a) the gas stream containing nitrogen oxides and laughing gas is reacted with a reducing gas, the reducing gas comprising a saturated hydrocarbon, in the presence of a first catalyst that contains cobalt and, as support, an inorganic metal oxide, (b) the gaseous product from step (a) is reacted with a reducing gas, the reducing gas comprising a saturated hydrocarbon, in the presence of a second catalyst that contains iron and, as support, an inorganic metal oxide.

Advantage of the present invention are that the simultaneous removal of nitrogen oxides and laughing gas can effectively take place over a broad temperature range. Another advantage of the present invention is that high degrees of conversion can be achieved at low temperatures, even in the case of high GHSV (gas hourly space velocities) values. Moreover, it is not necessary to supply additional reducing gas to step (b). Furthermore, the two steps (a) and (b) can be carried out in one, it not being necessary to heat or to cool the gas between steps (a) and (b). The use in step (a) of the catalyst that contains cobalt and, as support, an inorganic metal oxide has the advantage that no additional $N_2O$ is produced.

The (first) catalyst used in step (a) is preferably the cobalt catalyst which is described in U.S. Pat. No. 5,149,512 and that is incorporated here by reference. That is to say this catalyst is preferably a crystalline zeolite having a silicon:aluminium ratio of 2.5 or above, the zeolite having been exchanged with an effective amount of a cobalt cation, preferably $Co^{2+}$. In particular, the zeolite has been exchanged with 0.1 to 15% (m/m) cation, based on the total weight of the exchanged zeolite.

According to the invention, after exchanging with cobalt, the zeolite can then also be exchanged with approximately 0.01 to 2.0% (m/m) of an additional metal, based on the total weight of the exchanged zeolite, said additional metal being a metal of the third period of Groups 5 to 11 in the Periodic System of the Elements. The exchanged zeolite can furthermore be impregnated with 0.01 to 15% (m/m), in particular 0.1 to 8.0% (m/m), based on the total weight of the impregnated, exchanged zeolite, of anionic or neutral material that contains a metal from Group 5, 6, 7 or 11 of the Periodic System of the Elements.

The (second) catalysts used in step (b) are preferably those which are described in WO 99/49954 and NL A 1 012 983 and which are incorporated here by reference. That is to say this catalyst is preferably a crystalline zeolite having an $SiO_2:Al_2O_3$ ratio of less than 100, preferably less than 65 and in particular less than or equal to 40, the zeolite having been exchanged with an effective amount of an iron cation, preferably $Fe^{2+}$. The zeolite is preferably at least partially exchanged with $(NH_4)_2Fe(SO_4)_2 \cdot 6H_2O$. A preferred embodiment of the catalyst used in step (b) is Fe-ZSM-5. The catalyst used in step (b) can also be a promoted catalyst, the catalyst being promoted with one or more noble metals, the noble metal preferably being ruthenium, rhodium, palladium, gold or platinum. A palladium-promoted Fe-ZSM-5 catalyst is preferably used.

Preferred embodiments of the zeolite supports comprise the MOR and MFI types. The zeolites can be used in the sodium, potassium, ammonium or hydrogen form. The zeolite, the counter-ion and also the Si/Al ratio can be suitably chosen by those skilled in the art. This is described, inter alia, in standard works on zeolites and also in U.S. Pat. No. 5,149,512 and WO 99/49954 and a number of other cited documents.

According to the invention steps (a) and (b) are carried out in one reactor, the two catalysts being used in series in a stacked bed.

The reducing gas is preferably methane, propane, natural gas, n-butane or LPG (where LPG is a mixture containing propane and butane). The molar ratio of the added reducing agent with respect to the sum of the concentrations of laughing gas and nitrogen oxides is 0.1 to 100 and preferably 0.1 to 20.

The method according to the invention is preferably carried out at a temperature of 150° C. to 700° C. and in particular of 250° C. to 600° C. The pressure is preferably 1 to 50 bar absolute (bara) and in particular 1 to 15 bar absolute.

The invention also relates to a catalyst system for the simultaneous removal of nitrogen oxides and laughing gas from a gas stream containing nitrogen oxides and laughing gas by means of a reducing gas, which catalyst system comprises the first and second catalysts as described above.

The catalyst system can be used for the treatment of off-gases from a nitric acid plant.

EXAMPLES

Catalysts

Example 1

A zeolite exchanged with cobalt was prepared by exchanging 100 g Na-ZSM-5 (Alsi Penta SN 27, dried for 24 hours at 125° C.) with a solution of 29.2 g $Co(NO_3)_2.6H_2O$ (Merck) in 3 litres of water for 24 hours at 80° C. The catalyst was then washed with water, dried and calcined for 5 hours at 550° C. The catalyst has a loading of 2.7% (m/m) cobalt.

Example 2

A zeolite exchanged with iron was prepared by adding 100 g $NH_4$-ZSM-5 powder (Alsi Penta SM 27, dried for 24 hours at 125° C.) to a solution of 38.9 g $(NH_4)_2Fe(SO_4)_2.6H_2O$ (Merck) in 3 litres of water. Ion exchange then takes place for 24 hours at 80° C. After washing with water, the catalyst was dried for 16 hours at 80° C. and calcined for 5 hours at 550° C. The catalyst has a loading of 2.3% (m/m) iron.

Example 3

A promoted catalyst was prepared by impregnating 100 g of a catalyst according to Example 2 with 3.1 g of a solution of $Pd(NO_3)_2$ (10% (m/m) in nitric acid, Aldrich) in demineralised water so that the pores of the base material were precisely filled (so-called "incipient wetness impregnation"). The concentration of the noble metal precursor was adjusted such that a percentage by weight of Pd of 0.15 based on the total weight of the catalyst was obtained. Finally the catalyst was dried for 16 hours at 80° C. and calcined for 5 hours at 550° C. The catalyst had a loading of 2.7% (m/m) iron and 0.15% (m/m) palladium.

Test Apparatus

The reaction of NO, $NO_2$ and $N_2O$ with propane was studied in an automated flow set-up. The gases $N_2$, air, NO, $NO_2$, $N_2O$ and propane were introduced and the partial pressures (see Table 2) controlled by means of calibrated Mass Flow Controllers (Brooks). Water was added via a Liquiflow controller and a Controlled Evaporator Mixer (Bronkhorst). Analysis of the outflowing gases was carried out by means of a calibrated FTIR spectrophotometer (Elsag, Bailey, Hartmann & Braun, model MB 100). The catalysts were pressed to form a tablet, ground and sieved. The catalyst particles were in a stainless steel reactor. The gases were passed through a preheating section before they came into contact with the catalyst. The temperature was measured by means of thermocouples at the inlet and at the outlet of the catalyst bed. The temperature at the inlet of the catalyst bed is given in the test results. The pressure in the test set-up could be set to 1 to 5 bar absolute (bara). The carrier gas in the examples is $N_2$.

Example 4

In these experiments the degrees of conversion of NO, $NO_2$ and $N_2O$ by a stacked bed of the following catalysts were determined: step (a) Co-ZSM-5 according to Example 1 (Catalyst I) and step (b) Fe-ZSM-5 according to Example 2 (Catalyst II).

The conditions are given in Table 1, the gas compositions in Table 2 and the degrees of conversion in Table 3.

TABLE 1

| | |
|---|---|
| Volume | 10 ml |
| Flow | 5 l/min |
| GHSV | 30000 l/h |
| p | 1 bara |

TABLE 2

| | | | |
|---|---|---|---|
| $N_2O$ | 1500 ppm | $H_2O$ | 0.5% |
| NO | 500 ppm | $O_2$ | 2.5% |
| $NO_2$ | 0 ppm | $C_3H_8$ | 1500 ppm |

The starting material in all tests was the gas mixture in Table 2 (unless stated otherwise). Tests were also carried out using a mixture of NO and $NO_2$ instead of NO as the starting material. Comparable results were obtained in these tests.

TABLE 3

| | Cat. | | | | | |
|---|---|---|---|---|---|---|
| | II | | I | | I + II | |
| | Cat.bed | | | | | |
| | 10 ml | | 10 ml | | 10 + 10 ml | |
| T | | | | | | $NO_x$ |
| (° C.) | $N_2O$ (%) | $NO_x$ (%) | $N_2O$ (%) | $NO_x$ (%) | $N_2O$ (%) | (%) |
| 280 | 18 | 46 | 0 | 3 | 39 | 58 |
| 309 | 66 | 47 | 0 | 15 | 86 | 62 |
| 338 | 90 | 39 | 1 | 44 | 98 | 72 |
| 368 | 98 | 30 | 9 | 88 | 100 | 94 |
| 399 | 100 | 23 | 59 | 99 | 100 | 100 |
| 431 | 100 | 17 | 85 | 99 | 100 | 98 |
| 462 | 100 | 13 | 96 | 95 | 100 | 94 |
| 491 | 100 | 11 | 99 | 88 | 100 | 88 |

Figure 1:
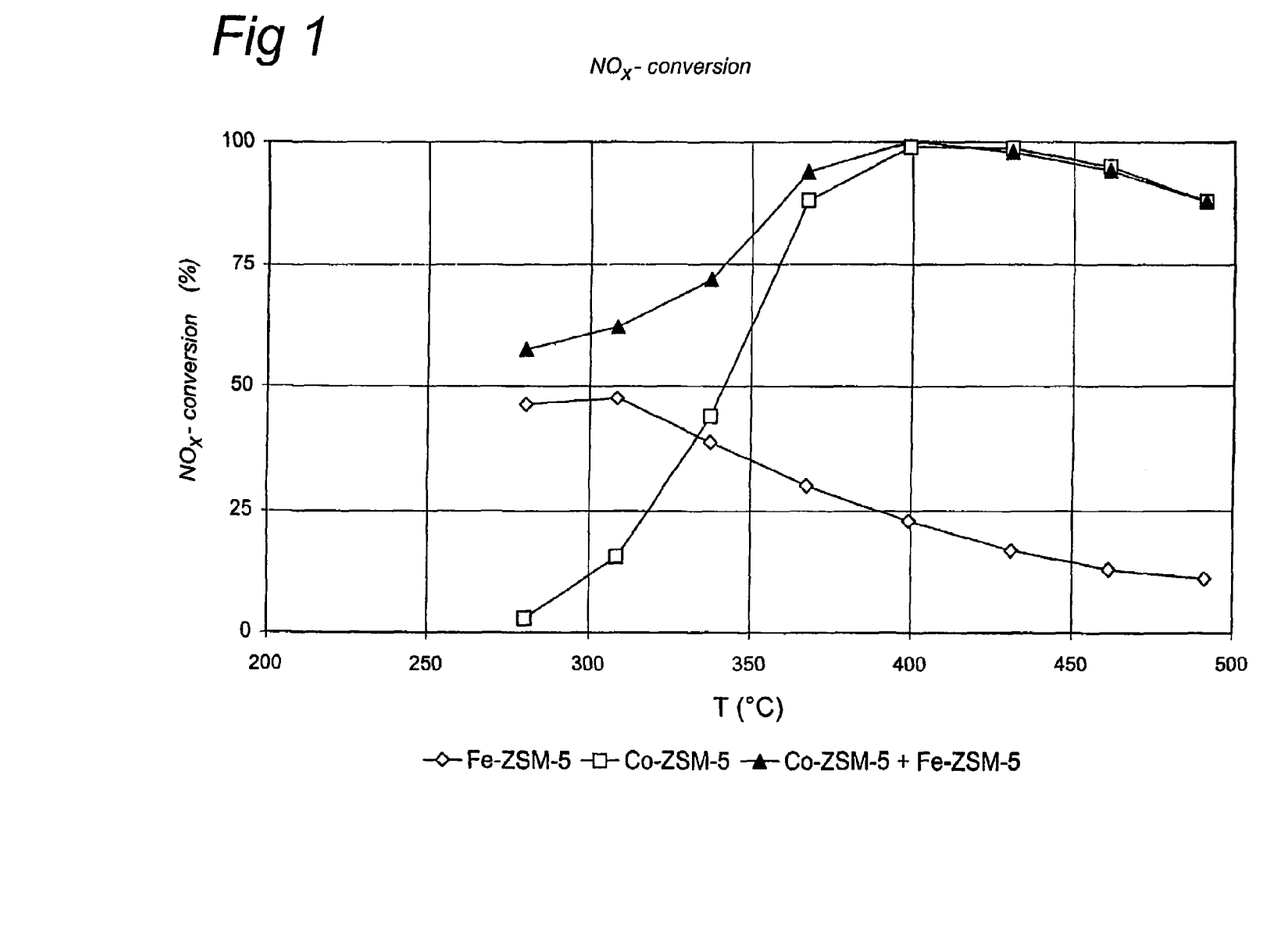
FIG. 1: $NO_x$ conversion by Catalyst I (Co-ZSM-5), Catalyst II (Fe-ZSM-5) and a serial combination of the two.
Figure 2:
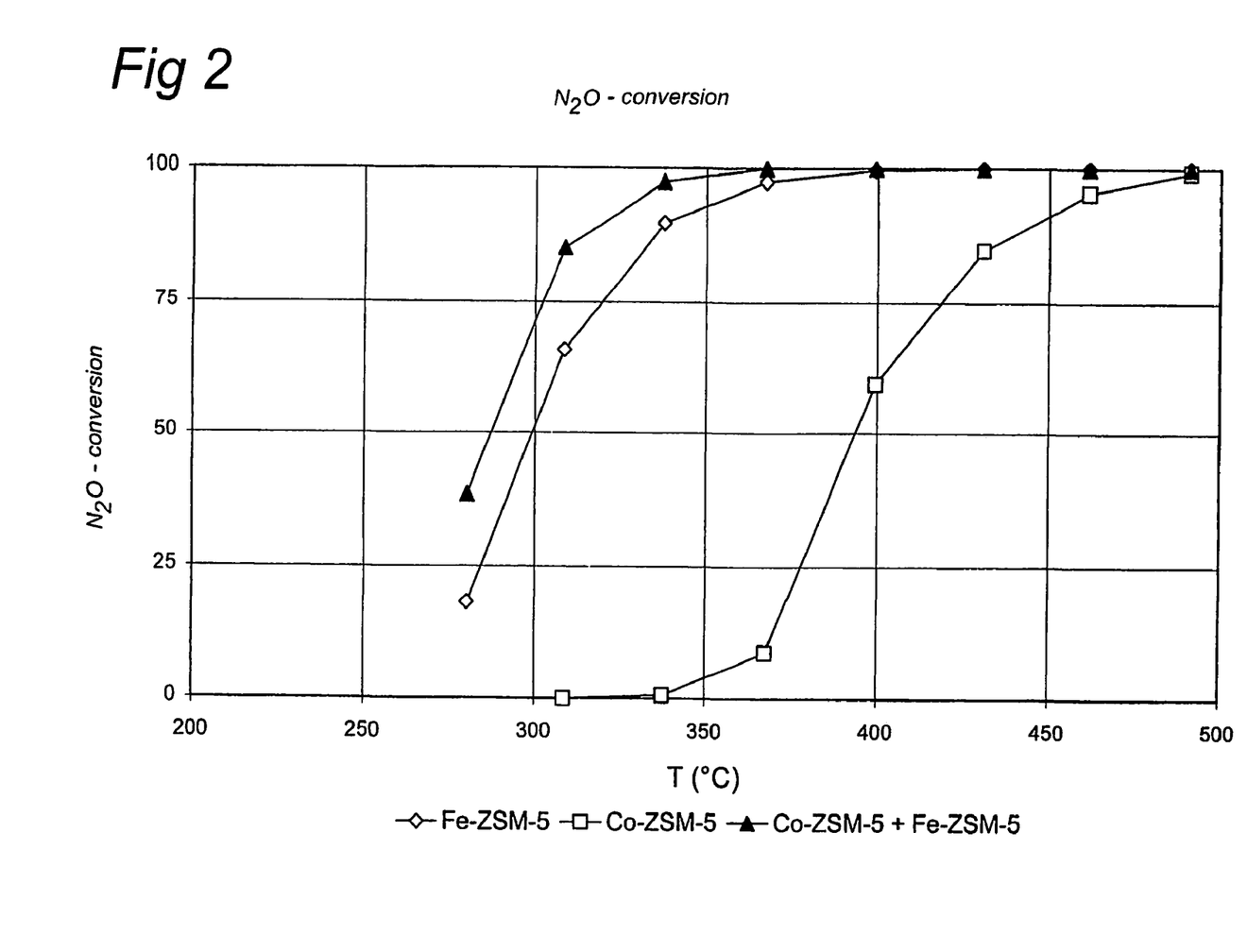
FIG. 2: $N_2O$ conversion by Catalyst I (Co-ZSM-5), Catalyst II (Fe-ZSM-5) and a serial combination of the two.

The results in Table 3 are shown as a graph in FIGS. 1 and 2, from which it is clear that simultaneous efficient conversion of $NO_x$ and $N_2O$ is possible only with the catalyst combination.

Example 5

It should be possible to use the cobalt and iron catalysts as a mixture. A comparative example is given below in which the degrees of conversion of $NO_x$ and $N_2O$ in a reactor in which the catalysts are present as a mixture are compared with the degrees of conversion by the stacked bed catalyst system of the present invention. The conditions are given in Table 4 and the test results are shown in Table 5. The gas mixture from Table 2 and the Catalysts I (Co-ZSM-5 according to Example 1) and III (Pd—Fe-ZSM-5 according to Example 3) were used in the experiment.

TABLE 4

| | |
|---|---|
| Volume | 12.5 ml |
| Flow | 5 l/min |
| GHSV | 24000 l/h |
| p | 4 bara |

TABLE 5

| I | 2.5 ml | | | |
|---|---|---|---|---|
| III | 10 ml | | | |
| Configuration | Mixture | | Stack | |
| T (° C.) | $N_2O$ (%) | $NO_x$ (%) | $N_2O$ (%) | $NO_x$ (%) |
| 210 | 0 | 34 | 0 | 34 |
| 235 | 0 | 53 | 1 | 55 |
| 265 | 36 | 80 | 57 | 67 |
| 297 | 78 | 71 | 82 | 56 |
| 325 | 93 | 63 | 95 | 59 |
| 353 | 99 | 56 | 99 | 81 |
| 382 | 100 | 50 | 100 | 91 |
| 410 | 100 | 43 | 100 | 93 |
| 440 | 100 | 38 | 100 | 93 |
| 469 | 100 | 36 | 100 | 92 |
| 500 | 100 | 37 | 100 | 90 |

Figure 3:
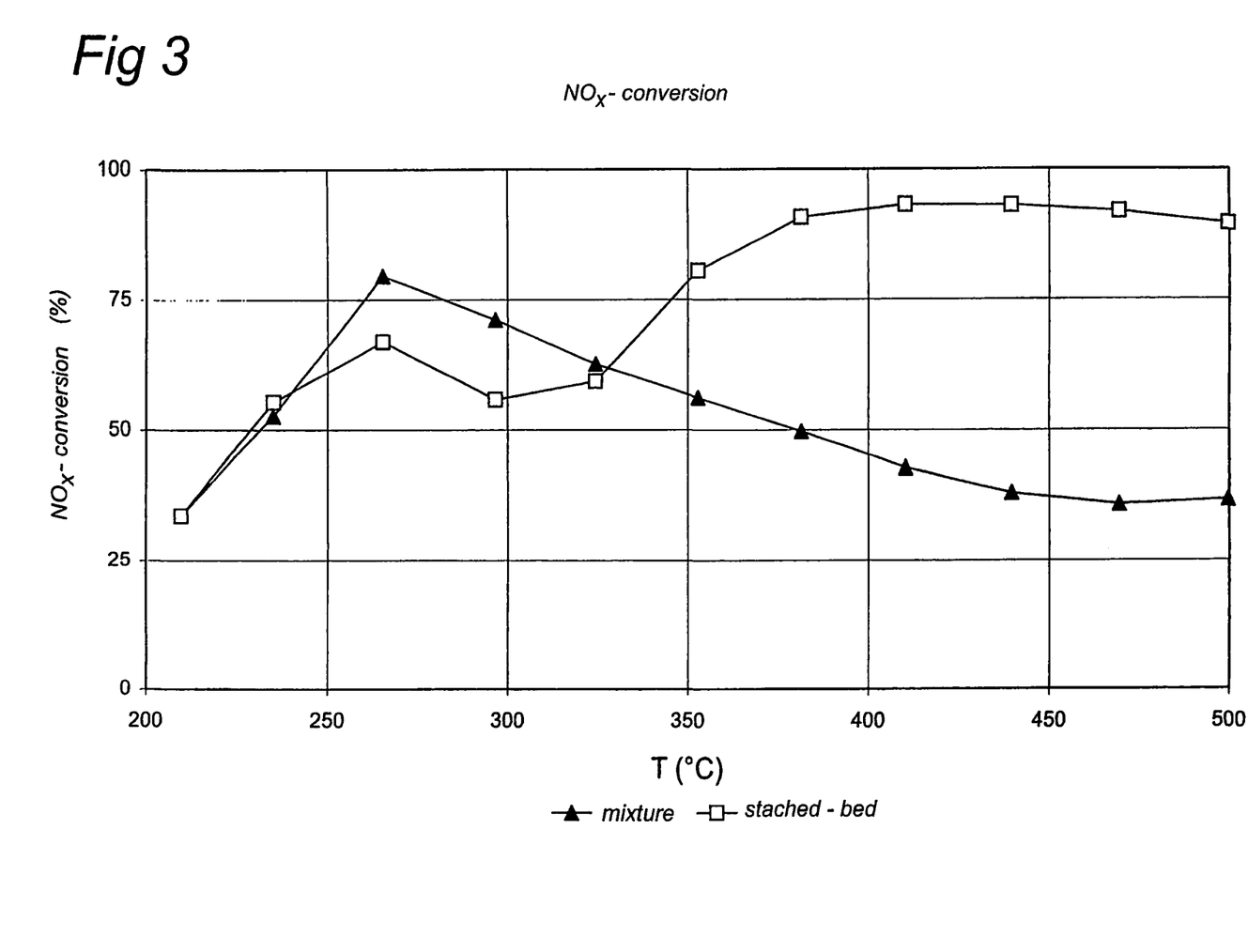
FIG. 3: $NO_x$ conversion by Catalyst I (Co-ZSM-5) and Catalyst III (Pd—Fe-ZSM-5) as a mixture and in serial combination.
Figure 4:
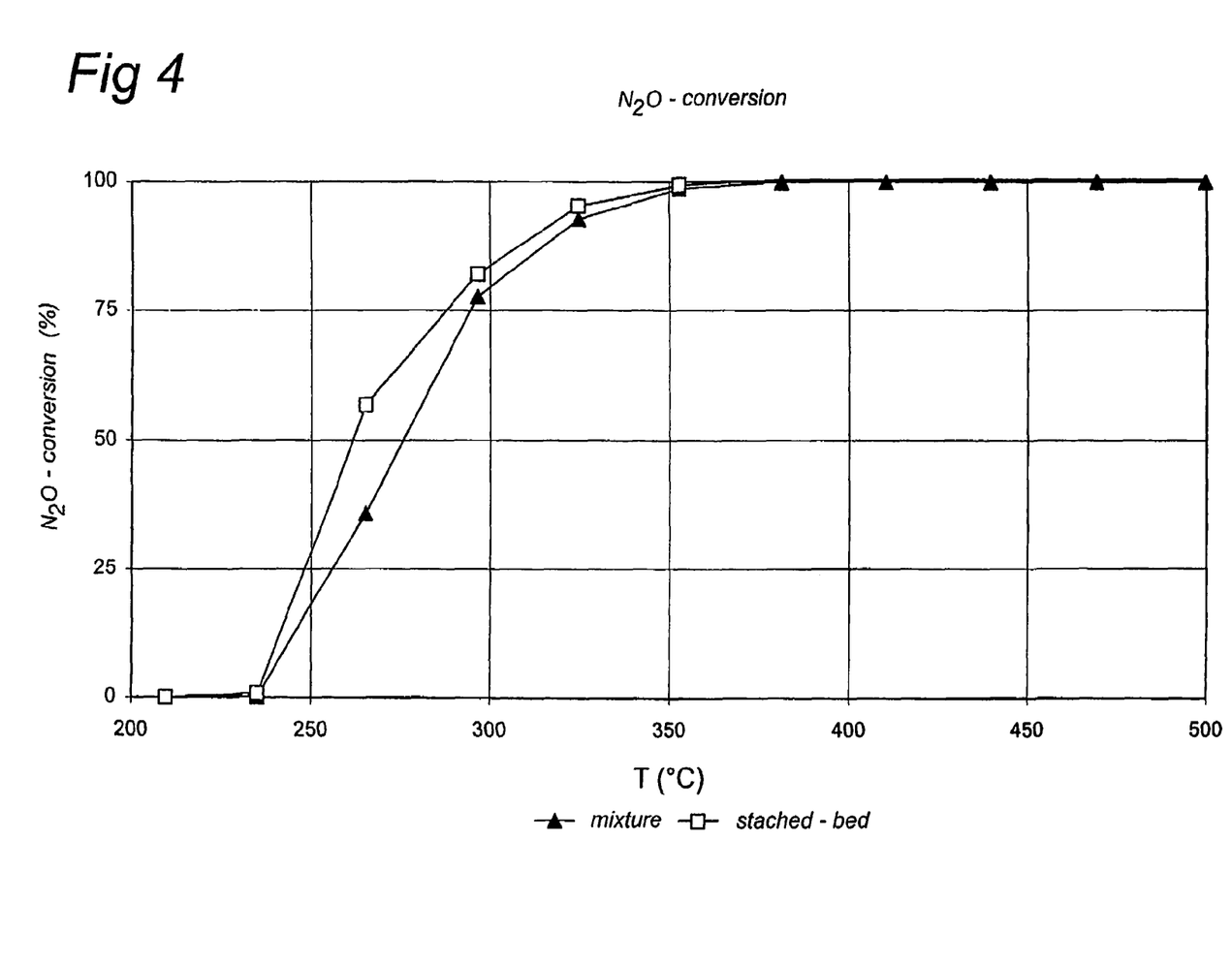
FIG. 4: $N_2O$ conversion by Catalyst I (Co-ZSM-5) and Catalyst III (Pd—Fe-ZSM-5) as a mixture and in serial combination.

The test results from Table 5 are shown in FIGS. 3 and 4. It can be seen from these results that the $N_2O$ conversion under these conditions is advantageous for the stack configuration, especially at lower temperatures. The $NO_x$ conversion shows a substantial difference. Up to approximately 250° C. the degree of $NO_x$ conversion for the mixture increases with increasing temperature; above this temperature the degree of $NO_x$ conversion decreases. A complete conversion is thus impossible using a mixture of the Co and Fe catalysts. Surprisingly, the stack configuration under these conditions yields virtually complete conversion above approximately 380° C.

Example 6

In this example the various sequences of Catalysts I and II (see Example 4) were compared. The conditions are given in Table 6 and the results in Table 7. The gas composition was as in Example 4. It can clearly be seen from Table 7 that much better results are obtained with the sequence I–II, which can be seen in particular from the degree of $NO_x$ conversion.

TABLE 6

| Volume | 0.3 ml |
|---|---|
| Flow | 0.15 l/min |
| GHSV | 30000 l/h |
| p | 1 bara |

TABLE 7

| | I | 0.15 ml | II | 0.15 ml |
|---|---|---|---|---|
| | II | 0.15 ml | I | 0.15 ml |
| T(° C.) | $N_2O$ (%) | $NO_x$ (%) | $N_2O$ (%) | $NO_x$ (%) |
| 300 | 6 | 29 | 3 | 29 |
| 320 | 23 | 38 | 16 | 40 |
| 340 | 63 | 47 | 52 | 56 |
| 359 | 88 | 48 | 82 | 64 |
| 378 | 98 | 67 | 95 | 60 |
| 396 | 100 | 88 | 100 | 53 |
| 414 | 99 | 93 | 100 | 41 |
| 433 | 98 | 92 | 100 | 26 |
| 451 | 87 | 99 | 100 | 16 |
| 489 | 99 | 94 | 100 | 6 |

Example 7

In this example the effect of the addition of Catalyst III on the CO concentration was determined. Catalyst III is Catalyst II with 0.15% (m/m) Pd according to Example 3.

It can be seen that replacement of half of Catalyst II by Catalyst III leads to an appreciable reduction in the emission of CO (see Table 8 for the conditions and Table 9 for the results). The degree of $NO_x$ and $N_2O$ conversion is not adversely affected by the addition of Catalyst III. The gas composition was as in Example 4.

TABLE 8

| Volume | 20 ml |
|---|---|
| Flow | 5 l/min |
| GHSV | 15000 l/h |
| p | 1 bara |

TABLE 9

| | Cat. | | | | | | | |
|---|---|---|---|---|---|---|---|---|
| | I 10 ml | | | | I 10 ml | | | |
| | II 10 ml | | | | II 5 ml | | | |
| | | | | | III 5 ml | | | |
| | Emission | | Conversion | | Emission | | Conversion | |
| T (° C.) | CO (ppm) | $C_3H_8$ (ppm) | $N_2O$ (%) | $NO_x$ (%) | CO (ppm) | $C_3H_8$ (ppm) | $N_2O$ (%) | $NO_x$ (%) |
| 288 | 1588 | 561 | 39 | 58 | 111 | 494 | 48 | 54 |
| 316 | 1799 | 254 | 86 | 62 | 78 | 206 | 88 | 59 |
| 345 | 1816 | 159 | 98 | 72 | 61 | 106 | 99 | 73 |
| 375 | 1540 | 59 | 100 | 94 | 43 | 42 | 100 | 88 |
| 407 | 714 | 4 | 100 | 100 | 28 | 6 | 100 | 96 |
| 437 | 284 | 0 | 100 | 98 | 17 | 0 | 100 | 96 |
| 466 | 147 | 0 | 100 | 94 | 11 | 0 | 100 | 92 |
| 495 | 114 | 0 | 100 | 88 | 7 | 0 | 100 | 87 |

Example 8

In this example it is demonstrated that using the combination of Catalysts I and III high degrees of conversion of $NO_x$ and $N_2O$ are possible without the adverse formation of CO. It is also demonstrated in this example that high degrees of conversion of $NO_x$ and $N_2O$ are possible with a space velocity that is twice as high (30000 $h^{-1}$ instead of 15000 $h^{-1}$). The conditions and results are given in Tables 10 and 11, respectively. The gas composition was as in Example 4.

TABLE 10

| Volume | 10 ml |
|---|---|
| Flow | 5 l/min |
| GHSV | 30000 l/h |
| p | 4 bara |

TABLE 11

| | I | 5 ml | I | 5 ml |
|---|---|---|---|---|
| | II | 2.5 ml | III | 5 ml |
| Cat. | III | 2.5 ml | | |
| T(° C.) | $N_2O$ (%) | $NO_x$ (%) | $N_2O$ (%) | $NO_x$ (%) |
| 288 | 54 | 67 | 57 | 57 |
| 316 | 82 | 72 | 85 | 77 |

TABLE 11-continued

| 345 | 94  | 82 | 86  | 97 |
| --- | --- | -- | --- | -- |
| 375 | 97  | 88 | 87  | 99 |
| 407 | 99  | 90 | 95  | 99 |
| 437 | 100 | 90 | 100 | 98 |
| 466 | 100 | 88 | 100 | 95 |
| 495 | 100 | 86 | 100 | 91 |

Example 9

In this example the effect of the pressure was determined. It is found that more $NO_x$ and $N_2O$ is converted at higher pressure. The effect for $NO_x$ is most pronounced at low temperature. The CO emission is lower at higher pressure. The conditions are summarised in Table 12 and the results in Table 13. The gas composition was as in Example 4.

TABLE 12

| I   | 10 ml | Volume | 20 ml       |
| --- | ----- | ------ | ----------- |
| II  | 5 ml  | Flow   | 5 l/min     |
| III | 5 ml  | GHSV   | 15000 l/h   |
|     |       | p      | 1 to 4 bara |

TABLE 13

| | Pressure | | | | | | | | |
|---|---|---|---|---|---|---|---|---|---|
| | 1 bara | | | 2 bara | | | 4 bara | | |
| T (° C.) | CO (ppm) | $N_2O$ (%) | $NO_x$ (%) | CO (ppm) | $N_2O$ (%) | $NO_x$ (%) | CO (ppm) | $N_2O$ (%) | $NO_x$ (%) |
| 288 | 111 | 48  | 54 | 69 | 72  | 68 | 22 | 81  | 82 |
| 316 | 78  | 88  | 59 | 23 | 95  | 67 | 13 | 98  | 89 |
| 345 | 61  | 99  | 73 | 17 | 100 | 78 | 10 | 100 | 97 |
| 375 | 43  | 100 | 88 | 12 | 100 | 90 | 8  | 100 | 99 |
| 407 | 28  | 100 | 96 | 7  | 100 | 96 | 7  | 100 | 99 |
| 437 | 17  | 100 | 96 | 4  | 100 | 96 | 5  | 100 | 98 |
| 466 | 11  | 100 | 92 | 4  | 100 | 94 | 4  | 100 | 96 |
| 495 | 7   | 100 | 87 | 4  | 100 | 90 | 3  | 100 | 93 |

Example 10

The reaction where for the Co catalyst a mordenite support was chosen instead of a ZSM-5 support (see Example 1), is described in this example. Methane was also selected instead of propane (see Table 2). For this reaction a Catalyst IV, Co-mordenite, was first prepared by impregnating 5 g MOR (mordenite from Zeolyst CBV 21A) with 1 g $Co(NO_3)_2.6H_2O$ in solution (density 1.34 g/ml). The catalyst was promoted with a small amount of Pd (0.37% (m/m) Pd). The final Co concentration is 2.2% (m/m).

As described above, a reactor containing a stacked bed was used, the first catalyst in this example being the Co—Pd-MOR catalyst (Catalyst IV) and the second catalyst the Pd—Fe-ZSM-5 catalyst from Example 3 (Catalyst III). The conditions are given in Table 14. The gas composition is shown in Table 15.

TABLE 14

| Volume | 30 ml     |
| ------ | --------- |
| Flow   | 5 l/min   |
| GHSV   | 10000 l/h |
| p      | 4 bara    |

TABLE 15

| $N_2O$ | 1500 ppm | $H_2O$ | 0.5%     |
| ------ | -------- | ------ | -------- |
| NO     | 500 ppm  | $O_2$  | 2.5%     |
| $NO_2$ | 0 ppm    | $CH_4$ | 2500 ppm |

Figure 5:
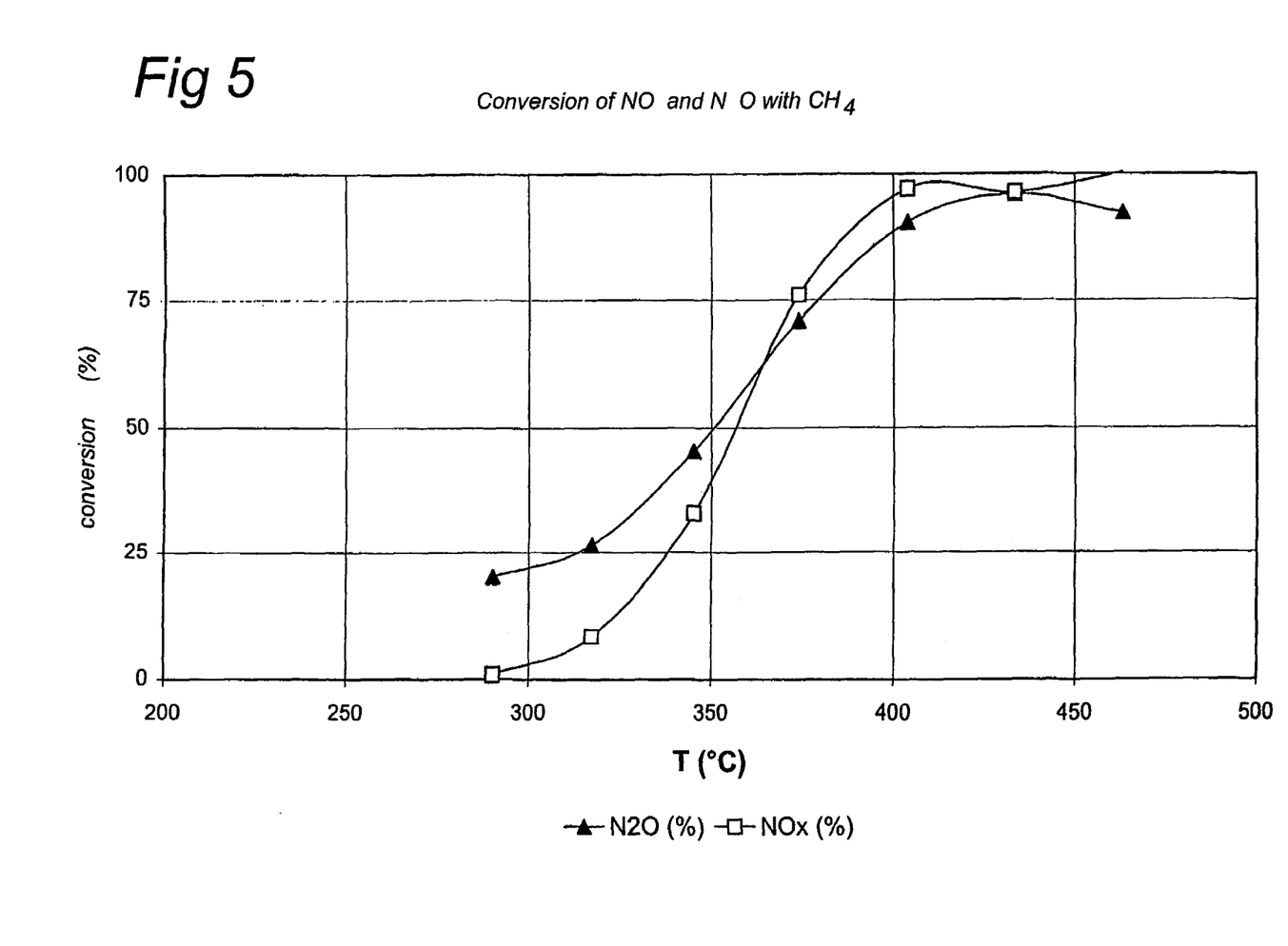
FIG. 5: $NO_x$ and $N_2O$ conversion by a stacked bed catalyst of Catalyst IV (III(Co—Pd-MOR) and III (Pd—Fe-ZSM-5) using $CH_4$ as reducing gas.

The test results are given in Table 16 and plotted as a graph in FIG. 5.

TABLE 16

| IV  |          | 15 ml       |
| --- | -------- | ----------- |
| III |          | 15 ml       |
| T (° C.) | $N_2O$ (%) | $NO_x$ (%) |
| 290 | 20 | 1   |
| 317 | 27 | 8   |
| 345 | 45 | 33  |
| 374 | 71 | 76  |
| 404 | 91 | 97  |
| 433 | 96 | 96  |
| 463 | 92 | 100 |

It can be seen from these data that high degrees of conversion to virtually complete conversions can also be achieved with methane over a broad temperature range.

The invention claimed is:

1. Method for the simultaneous removal of nitrogen oxides and laughing gas from a gas stream containing nitrogen oxides and laughing gas, wherein a first catalyst that contains cobalt and, as a support, a first inorganic metal oxide, and a second catalyst that contains iron and, as a second support, a second inorganic metal oxide, are used, and wherein each of the first and second inorganic metal oxide is a zeolite.

2. Method according to claim 1, wherein:
   (a) the gas stream containing nitrogen oxides and laughing gas is reacted with a first reducing gas comprising a saturated hydrocarbon, in the presence of the first catalyst to obtain a gaseous product; and
   (b) the gaseous product from step (a) is reacted with a second reducing gas comprising a saturated hydrocarbon, in the presence of the second catalyst.

3. Method according to claim 2, wherein steps (a) and (b) are carried out in one reactor.

4. Method according to claim 3, wherein each of the first and second reducing gas is selected from the group consisting of propane, natural gas, n-butane or LPG.

5. Method according to claim 1, wherein the support for the first catalyst is a crystalline zeolite having a silicon:aluminum ratio of 2.5 or above.

6. Method according to claim 1, wherein the support for the second catalyst is a crystalline zeolite having a $SiO_2:Al_2O_3$ ratio of less than 100.

7. Method according to claim 1, wherein the support for the second catalyst is a crystalline zeolite having a $SiO_2:Al_2O_3$ ratio of less than 65.

8. Method according to claim 1, wherein the support for the second catalyst is a crystalline zeolite having a $SiO_2:Al_2O_3$ ratio of less than or equal to 40.

9. Method according to claim 1, wherein the second catalyst comprises a promoted catalyst.

10. Method according to claim 9, wherein the promoted catalyst has been promoted with Pt, Pd, Ru, Au or Rh.

11. Catalyst system for the simultaneous removal of nitrogen oxides and laughing gas from a gas stream containing nitrogen oxides and laughing gas with a reducing gas, wherein the catalyst system contains a first catalyst that comprises cobalt and, as support, a first inorganic metal oxide, and contains a second catalyst that comprises iron and, as support, a second inorganic metal oxide, and wherein each of the first and second inorganic metal oxide is a zeolite.

12. Catalyst system according to claim 11, wherein the catalysts are present in series in one reactor.

13. Catalyst system according to claim 11, wherein the support for the first catalyst is a crystalline zeolite having a silicon:aluminum ratio of 2.5 or above.

14. Catalyst system according to claim 13, wherein the support for the second catalyst is a crystalline zeolite having a $SiO_2:Al_2O_3$ ratio of less than 100.

15. Catalyst system according to claim 13, wherein the support for the second catalyst is a crystalline zeolite having a $SiO_2:Al_2O_3$ ratio of less than 65.

16. Catalyst system according to claim 13, wherein the support for the second catalyst is a crystalline zeolite having a $SiO_2:Al_2O_3$ ratio of less than or equal to 40.

17. Catalyst system according to claim 13, wherein the second catalyst comprises a promoted catalyst.

18. Catalyst system according to 17, wherein the promoted catalyst has been promoted with Pt, Pd, Ru, Au or Rh.

* * * * *